United States Patent
Steinberg et al.

(10) Patent No.: US 6,826,324 B2
(45) Date of Patent: Nov. 30, 2004

(54) OPTICAL WAVEGUIDE SWITCH

(75) Inventors: Dan A. Steinberg, Blacksburg, VA (US); David W. Sherrer, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 09/835,106

(22) Filed: Apr. 13, 2001

(65) Prior Publication Data

US 2001/0041026 A1 Nov. 15, 2001

Related U.S. Application Data

(60) Provisional application No. 60/197,154, filed on Apr. 13, 2000, and provisional application No. 60/201,347, filed on May 2, 2000.

(51) Int. Cl.[7] .............................. G02B 6/26; G02B 6/42
(52) U.S. Cl. ............................ 385/16; 385/15; 385/20
(58) Field of Search ..................... 385/15–17, 20–21, 385/25–27, 31

(56) References Cited

U.S. PATENT DOCUMENTS

| | | | |
|---|---|---|---|
| 3,864,018 A | 2/1975 | Miller ....................... 350/96 C |
| 4,150,870 A | 4/1979 | d'Auria .................... 350/96.16 |
| 4,165,496 A | 8/1979 | Di Domenico, Jr. et al. ............... 331/94.5 |
| 4,176,908 A | 12/1979 | Wagner ..................... 350/96.15 |
| 4,210,923 A | 7/1980 | North et al. .................... 357/30 |
| 4,225,213 A | 9/1980 | McBride, Jr. et al. ........ 350/96.2 |
| 4,296,995 A | 10/1981 | Bickel ...................... 350/96.15 |
| 4,325,604 A | 4/1982 | Witte ....................... 350/96.15 |
| 4,407,562 A | 10/1983 | Young ....................... 350/96.2 |
| 4,415,229 A | 11/1983 | McCullough ............... 350/96.2 |
| 4,498,730 A | 2/1985 | Tanaka et al. ............ 350/96.16 |
| 4,639,074 A | 1/1987 | Murphy .................... 350/96.15 |
| 4,699,457 A | 10/1987 | Goodman ................... 350/96.2 |
| 4,725,114 A | 2/1988 | Murphy .................... 350/96.17 |
| 4,756,590 A | 7/1988 | Forrest et al. ............ 350/96.15 |
| 4,859,022 A | 8/1989 | Opdahl et al. ............. 350/96.2 |
| 4,900,118 A | 2/1990 | Yanagawa et al. ........ 350/96.15 |
| 4,932,745 A * | 6/1990 | Blonder ....................... 385/18 |
| 4,973,127 A | 11/1990 | Cannon, Jr. et al. ...... 350/96.22 |

(List continued on next page.)

FOREIGN PATENT DOCUMENTS

| | | |
|---|---|---|
| DE | 3927441 | 2/1991 |
| EP | 0476241 | 3/1992 |
| JP | 63085522 | 4/1988 |
| JP | 1999305151 A | 11/1999 |

*Primary Examiner*—Michael C. Zarroli
(74) *Attorney, Agent, or Firm*—Niels Haun; Jonathan D. Baskin

(57) ABSTRACT

An optical switch includes a first wavedguide holding member and a second waveguide holding member disposed on a substrate. The first waveguide holding member moves relative to the second waveguide holding member. A movement guiding member guides the motion of the first waveguide holding member and the substrate.

Advantageously, the first waveguide holding member moves transversely relative to the second waveguide holding member. The traverse motion enables selective coupling between a waveguide in the first waveguide holding member and a waveguide in the second holding member. Through this transverse motion of the second waveguide holding member, an optical switching action may be implemented.

41 Claims, 7 Drawing Sheets

U.S. PATENT DOCUMENTS

| | | | |
|---|---|---|---|
| 5,044,711 A | 9/1991 | Saito | 350/96.2 |
| 5,123,073 A | 6/1992 | Pimpinella | 385/59 |
| 5,127,084 A | 6/1992 | Takahashi | 385/140 |
| 5,135,590 A | 8/1992 | Basavanhally et al. | 156/64 |
| 5,177,804 A | 1/1993 | Shimizu et al. | 385/20 |
| 5,179,609 A | 1/1993 | Blonder et al. | 385/89 |
| 5,181,216 A | 1/1993 | Ackerman et al. | 372/36 |
| 5,185,825 A | 2/1993 | Shigematsu et al. | 385/20 |
| 5,185,846 A | 2/1993 | Basavanhally et al. | 385/137 |
| 5,187,758 A | 2/1993 | Ueda et al. | 385/16 |
| 5,257,332 A * | 10/1993 | Pimpinella | 385/59 |
| 5,297,228 A | 3/1994 | Yanagawa et al. | 385/129 |
| 5,337,384 A | 8/1994 | Basavanhally et al. | 385/54 |
| 5,357,590 A | 10/1994 | Auracher | 385/33 |
| 5,379,361 A | 1/1995 | Maekawa et al. | 385/65 |
| 5,390,266 A | 2/1995 | Heitmann et al. | 385/44 |
| 5,440,655 A * | 8/1995 | Kaplow et al. | 385/25 |
| 5,461,683 A | 10/1995 | Harman | 385/21 |
| 5,483,608 A * | 1/1996 | Yokomachi et al. | 385/22 |
| 5,499,309 A | 3/1996 | Kozuka et al. | 385/38 |
| 5,500,910 A | 3/1996 | Boudreau et al. | 385/24 |
| 5,500,911 A | 3/1996 | Roff | 385/33 |
| 5,555,333 A | 9/1996 | Kato | 385/89 |
| 5,566,262 A | 10/1996 | Yamane et al. | 385/33 |
| 5,568,585 A | 10/1996 | Kramer | 385/139 |
| 5,602,951 A | 2/1997 | Shiota et al. | 385/81 |
| 5,611,006 A | 3/1997 | Tabuchi | 385/14 |
| 5,623,564 A | 4/1997 | Presby | 385/20 |
| 5,699,463 A | 12/1997 | Yang et al. | 385/22 |
| 5,727,099 A | 3/1998 | Harman | |
| 5,757,991 A | 5/1998 | Harman | 385/16 |
| 5,778,123 A | 7/1998 | Hagan et al. | 385/76 |
| 5,785,825 A | 7/1998 | Hwang et al. | 204/192.16 |
| 5,828,800 A | 10/1998 | Henry et al. | 385/20 |
| 5,901,262 A | 5/1999 | Kobayashi et al. | 385/89 |
| 5,909,524 A | 6/1999 | Tabuchi | 385/49 |
| 5,920,665 A * | 7/1999 | Presby | 385/16 |
| 6,045,270 A | 4/2000 | Weiss et al. | 385/59 |
| 6,056,696 A | 5/2000 | Kallman | 600/459 |
| 6,064,781 A | 5/2000 | Seibold et al. | 385/14 |
| 6,101,299 A | 8/2000 | Laor | 385/16 |
| 6,118,917 A | 9/2000 | Lee et al. | 385/49 |
| 6,160,936 A | 12/2000 | You et al. | 385/49 |
| 6,234,687 B1 | 5/2001 | Hall et al. | 385/88 |
| 6,320,997 B1 | 11/2001 | Dautartas et al. | 385/19 |
| 6,328,479 B1 | 12/2001 | Schofield et al. | 385/65 |
| 6,393,174 B1 | 5/2002 | Karaguleff et al. | 385/16 |
| 6,393,175 B1 | 5/2002 | Jurbergs et al. | |
| 6,477,303 B1 | 11/2002 | Witherspoon | 385/52 |
| 6,519,382 B1 | 2/2003 | Jurbergs et al. | 385/18 |
| 6,625,356 B2 | 9/2003 | Ticknor et al. | 385/39 |
| 2001/0041026 A1 | 11/2001 | Steinberg et al. | |
| 2002/0025104 A1 | 2/2002 | Steinberg et al. | 385/16 |
| 2002/0025107 A1 | 2/2002 | Heiks et al. | 385/20 |
| 2002/0028037 A1 | 3/2002 | Steinberg et al. | 385/20 |
| 2002/0146194 A1 | 10/2002 | Sherrer et al. | 385/16 |
| 2003/0108272 A1 | 6/2003 | Sherrer et al. | |

* cited by examiner

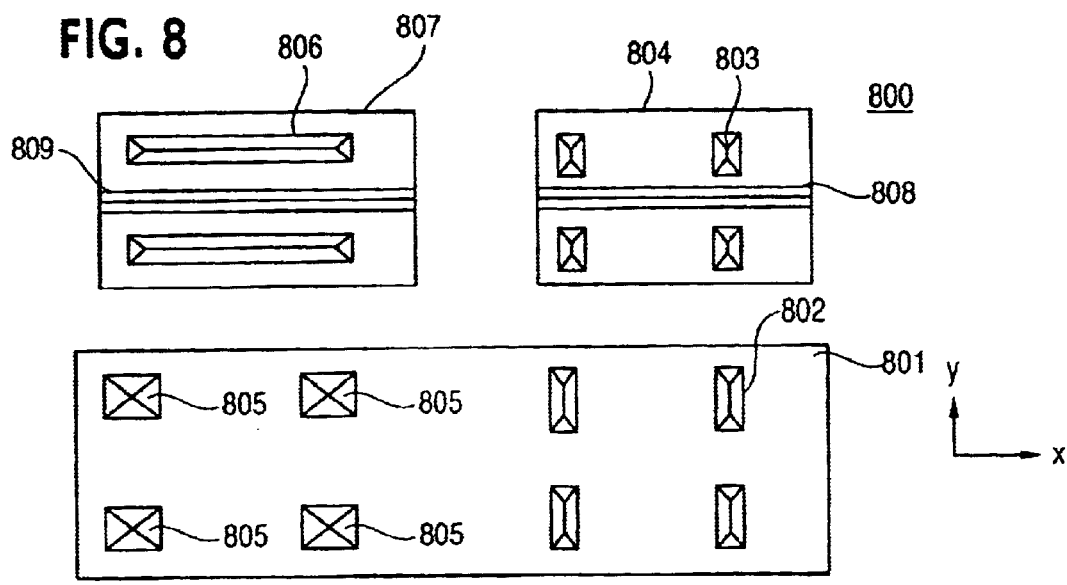
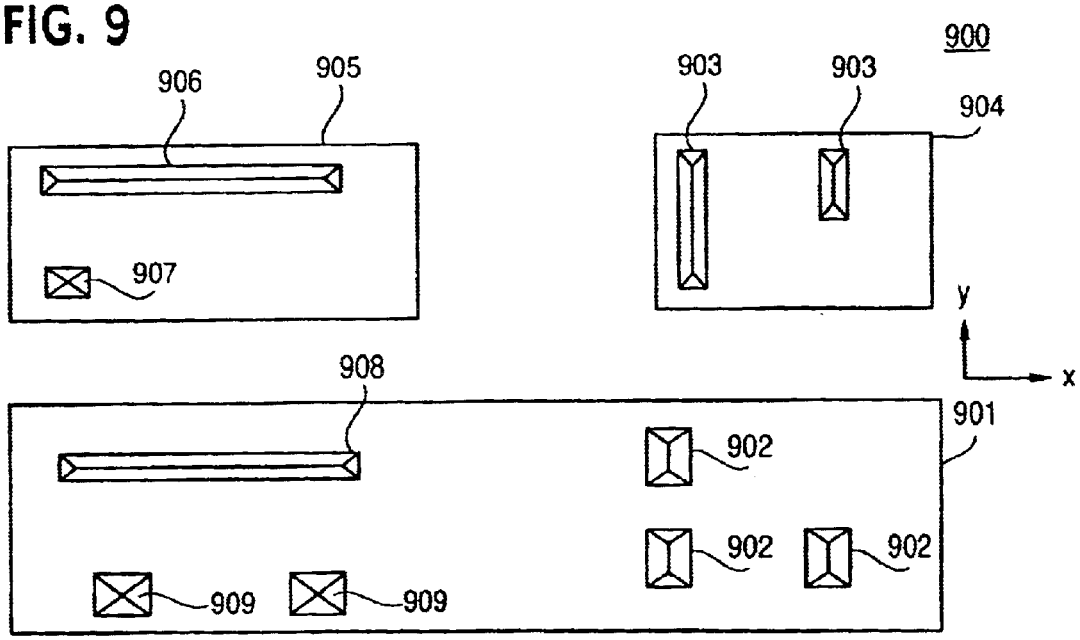

OPTICAL WAVEGUIDE SWITCH

CROSS-REFERENCE TO RELATED APPLICATION

The present invention claims priority from U.S. Provisional Patent Application No. 60/197,154 entitled "Fiber Array Switch Having Micromachined Front Face," filed Apr. 13, 2000. The present invention also claims priority from U.S. Provisional Patent Application No. 60/201,347 entitled "Optical Fiber Array Switches and Alternative Embodiments," filed May 2, 2000. The disclosures of the above captioned provisional patent applications are specifically incorporated by reference as though reproduced in their entirety herein.

FIELD OF THE INVENTION

The present invention relates generally to routing to optical switches in waveguides, and specifically to an array (mxn) optical switch.

BACKGROUND OF THE INVENTION

The increasing demand for high-speed voice and data communications has led to an increased reliance on optical communications, particularly optical fiber communications. The use of optical signals as a vehicle to carry channeled information at high speeds is preferred in many instances to carrying channeled information at other electromagnetic wavelengths/frequencies in media such as microwave transmission lines, co-axial cable lines and twisted pair transmission lines. Advantages of optical media are, among others, high-channel capacity (bandwidth), greater immunity to electromagnetic interference, and lower propagation loss. In fact, it is common for high-speed optical communication systems to have signal rates in the range of approximately several Giga bits per second (Gbit/sec) to approximately several tens of Gbit/sec.

One way of carrying information in an optical communication system, for example an optical network, is via an array of optical fibers. Ultimately, the optical fiber array may be coupled to another array of waveguides, such as another optical fiber array, or a waveguide array of an optoelectronic integrated circuit (OEIC). In order to assure the accuracy of the coupling of the fiber array to another waveguide array, it becomes important to accurately position each optical fiber in the array.

Optical switches serve a variety of applications in optical communication systems. Once such variety of optical switches are mechanical switches. Mechanical optical switches have been used in a variety of optical fiber routing applications to switch between particular optical signal pads to provide reliable optical transmission routes for carrying optical signals.

Many mechanical optical switch configurations which are commercially available are typically characterized as either optical-component-moving-type or fiber-moving-type switch configurations. Illustratively, optical-component-moving-type switches include configurations that employ movable optical element (e.g. mirrors or prisms) to selectively redirect signals from an end of a first optical fiber to an end from a second optical fiber wherein the optical fibers are arranged in a parallel manner with their ends adjacent one another. While beneficial optical-component-moving-type switches typically elaborate and often too expensive for large scale implementation.

Conventional fiber-moving-type switch configurations may provide multiple-port switching. However, these types of optical switches suffer from complexity, expense and chronically poor alignment which requires frequent and labor intensive adjustment. The relative complexity of conventional fiber-moving-type switches has resulted in prohibitive cost and relatively high alignment tolerances which ultimately impair the performance of the device.

Accordingly, what is needed is a relatively simple, inexpensive, mechanical stable optical switch configuration capable of providing multiple-port switching in a variety of optical applications.

SUMMARY OF THE INVENTION

According to an exemplary embodiment of the present invention, an optical switch includes a first waveguide holding member and a second waveguide holding member disposed on a substrate. The first waveguide holding member moves relative to the second waveguide holding member. A movement guiding member guides the motion of the first waveguide holding member.

Advantageously, the first waveguide holding member moves transversely relative to the second waveguide holding member. The transverse motion enables selective coupling between a waveguide in the first waveguide holding member and a waveguide in the second holding member. Through this transverse motion of the second waveguide holding member, an optical switching action may be implemented.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

FIGS. 6–9 are top views of substrates an d waveguide holding members according to exemplary embodiments of the present invention.

DEFINED TERMS

1. As used herein, the term "on" may be directly on. Alternatively "on" may mean "over."
2. As used herein, "longitudinal" means parallel to the optic axis of a waveguide (x-direction herein); "transverse" means perpendicular to the optic axis of a waveguide (y-direction herein).
3. As used herein, "movement guiding member" means a device or structure which constrains movement to substantially linear motion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

According to an exemplary embodiment of the present invention, an optical switch includes a first wavedguide holding member and a second waveguide holding member disposed on a substrate. The first waveguide holding member moves relative to the second waveguide holding member. A movement guiding member guides the motion of the first waveguide holding member.

Advantageously, the first waveguide holding member moves transversely relative to the second waveguide holding member. The traverse motion enables selective coupling between a waveguide in the first waveguide holding member and a waveguide in the second waveguide holding member. Through this transverse motion of the second waveguide holding member, an optical switching action may be implemented.

Figure 1:
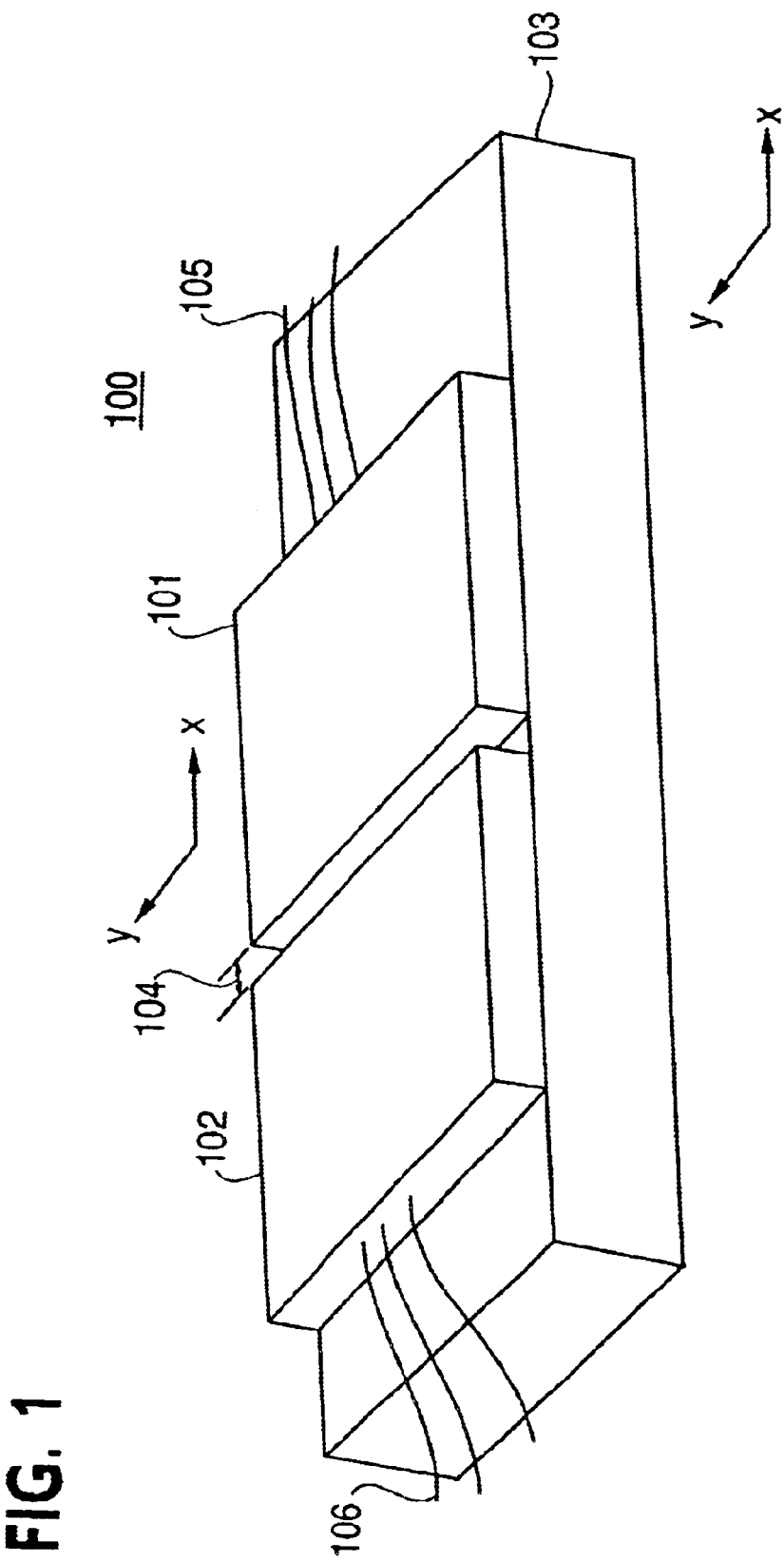
FIG. 1 is a perspective view of an optical fiber switch according to an exemplary embodiment of the present invention.

FIG. 1 shows an optical switch 100 according to an illustrative embodiment of the present invention. A first waveguide holding member 101 and a second waveguide holding member 102 are disposed over a substrate 103. Optical waveguides 105 and 106 are disposed in the first waveguide holding member 101 and the second waveguide holding member 102, respectively. The waveguides 105 and 106 within the first and second waveguide holding members are selectively optically coupled to one another. To this end, a gap spacing 104 between the first waveguide holding member 101 and the second waveguide holding member 102 may be set so that efficient optical coupling is achieved between selected waveguides in the first waveguide holding member 101 and the second waveguide holding member 102 is achieved.

After the gap spacing 104 has been set via longitudinal motion (x-direction) of the second waveguide holding member 102 relative to the first waveguide holding member 101, transverse (y-direction) motion may be carried out to selectively couple/decouple optical waveguide(s) in the first waveguide holding member 101 to an optical waveguide(s) in the second waveguide holding member 102. Accordingly, by virtue of the transverse motion of the first waveguide holding member 101 relative to the second waveguide holding member 102 the coupling/decoupling of waveguides may be used to achieve optical switching between selected waveguides.

Illustratively, the motion of the first waveguide holding member 101 and the second waveguide holding member 102 may be through the use of known mechanical actuators. These include, but are not limited to, electromagnetic, piezoelectric, microelectro-mechanical system (MEMs), and hydraulic devices.

Illustratively, waveguides 105 and 106 are optical fibers. However, they may be planar waveguides as well. The waveguides 105 and 106 may be disposed on the lower surfaces of the first and second waveguide holding members 101 and 102, respectively. This substantially avoids alignment problems due to variations in thicknesses of first and second waveguide holding members 101 and 102, respectively. Moreover, this placement of waveguides 105 and 106 substantially avoids front-side and back-side alignment errors. However, the optical waveguides may be located on the top surfaces of or within first and second waveguide holding members 101 and 102.

In the illustrative embodiment shown in FIG. 1, a movement guiding member (not shown) may be disposed so that the first waveguide holding member 101 moves transversely. Moreover, a similar movement guiding member may be disposed so that the second waveguide holding member 102 moves longitudinally. The longitudinal motion of the second waveguide holding member 102 allows adjustment of the gap spacing 104. For purposes of illustration and not limitation, after the gap spacing 104 has been set, the second waveguide holding member 102 may be secured in position by use of a suitable adhesive. For example, a suitable epoxy may be used to secure the second waveguide holding member 102 in position. Moreover, the second waveguide holding member 102 may be adhered to the substrate 103 by thermo-compression bonding with aluminum. The gap spacing may be in the range of approximately of less than approximately 1 $\mu$m to approximately 15 $\mu$m. Finally, it is of interest to note that the second waveguide holding member 102 may be located so that the gap spacing is set without longitudinal motion. This may be achieved through use of alignment fiducials or other suitable devices.

In this illustrative embodiment, the second waveguide holding member 102 may also be capable of transverse (y-direction) motion. This may be accomplished using a suitably disposed movement guiding member to achieve transverse motion. As such, the switching capabilities of the optical switch 100 may be achieved by one or both of the first and second waveguide holding members 101 and 102, respectively.

Figure 2:
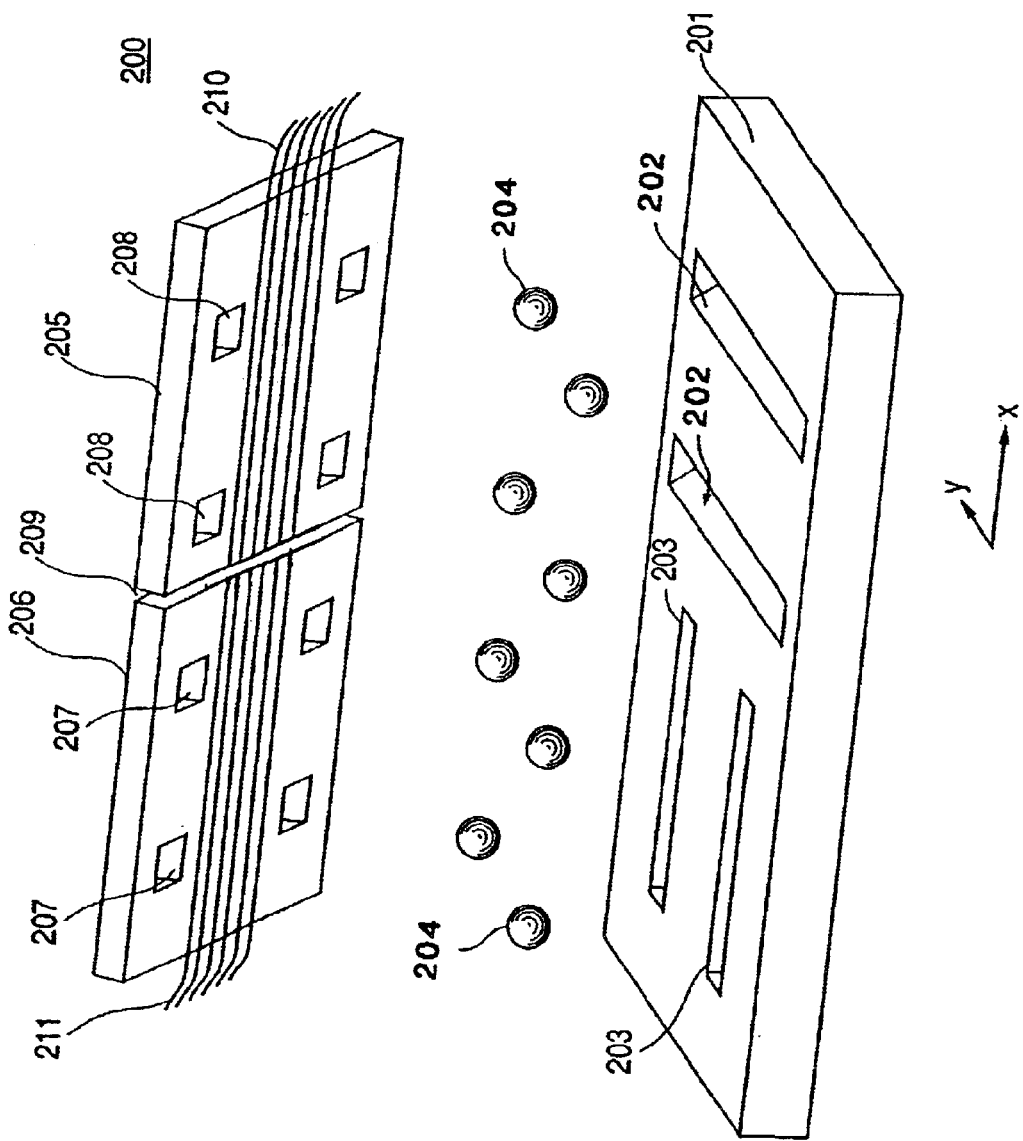
FIG. 2 is an exploded view of an optical switch according to an exemplary embodiment of the present invention.

Turning to FIG. 2, an exploded view of an optical switch 200 according to an exemplary embodiment of the present invention is shown. A substrate 201 illustratively includes longitudinal grooves 203 and transverse grooves 202. The longitudinal grooves 203 and transverse grooves 202 are adapted to receive positioning members 204. The positioning members 204 are illustratively microspheres or other suitable sphere-shaped objects. The positioning members 204 are disposed between the longitudinal grooves 203 and pits 207 disposed in second waveguide holding member 206. Positioning members 204 are also positioned between transverse grooves 202 and pits 208 disposed in first waveguide holding member 205. As can be readily appreciated the longitudinal and transverse grooves 201 and 202 of the substrate and the 208, 207 pits on the first and second waveguide holding members 205 and 206, respectively are on opposing surfaces thereof.

Illustratively, transverse motion of the first waveguide holding member 205 is achieved by motion of the positioning members 204 in grooves 202. The positioning members 204 are constrained by pits 208. Likewise, longitudinal motion of second waveguide holding member 206 is achieved through the motion of positioning members 204 in longitudinal grooves 203. The positioning members 204 are constrained in pits 207 in the second waveguide holding member 206.

As described in more detail above, the longitudinal motion may be used to adjust gap spacing 209 between the first waveguide holding member 205 and the second waveguide holding member 206. Transverse motion of the first waveguide holding member 205 may be used to achieve switching between waveguides 210 and 211. To this end, switching is achieved by selectively coupling/decoupling waveguides 210 disposed in first waveguide holding member 205 with waveguides 211 disposed in second waveguide holding member 206. Finally, it is of interest to note that waveguides 210 and 211 may be disposed on the lower surfaces of the first and second waveguide holding members 205 and 206, respectively. They may be held in v-grooves (not shown), for example. Moreover, the waveguides 210 and 211 may be disposed on the top surfaces of the waveguide holding members 205 and 206, respectively. Finally, waveguides 210 and 211 may be disposed within waveguide holding members 205 and 206, thereby being integral parts thereof.

Figure 3:
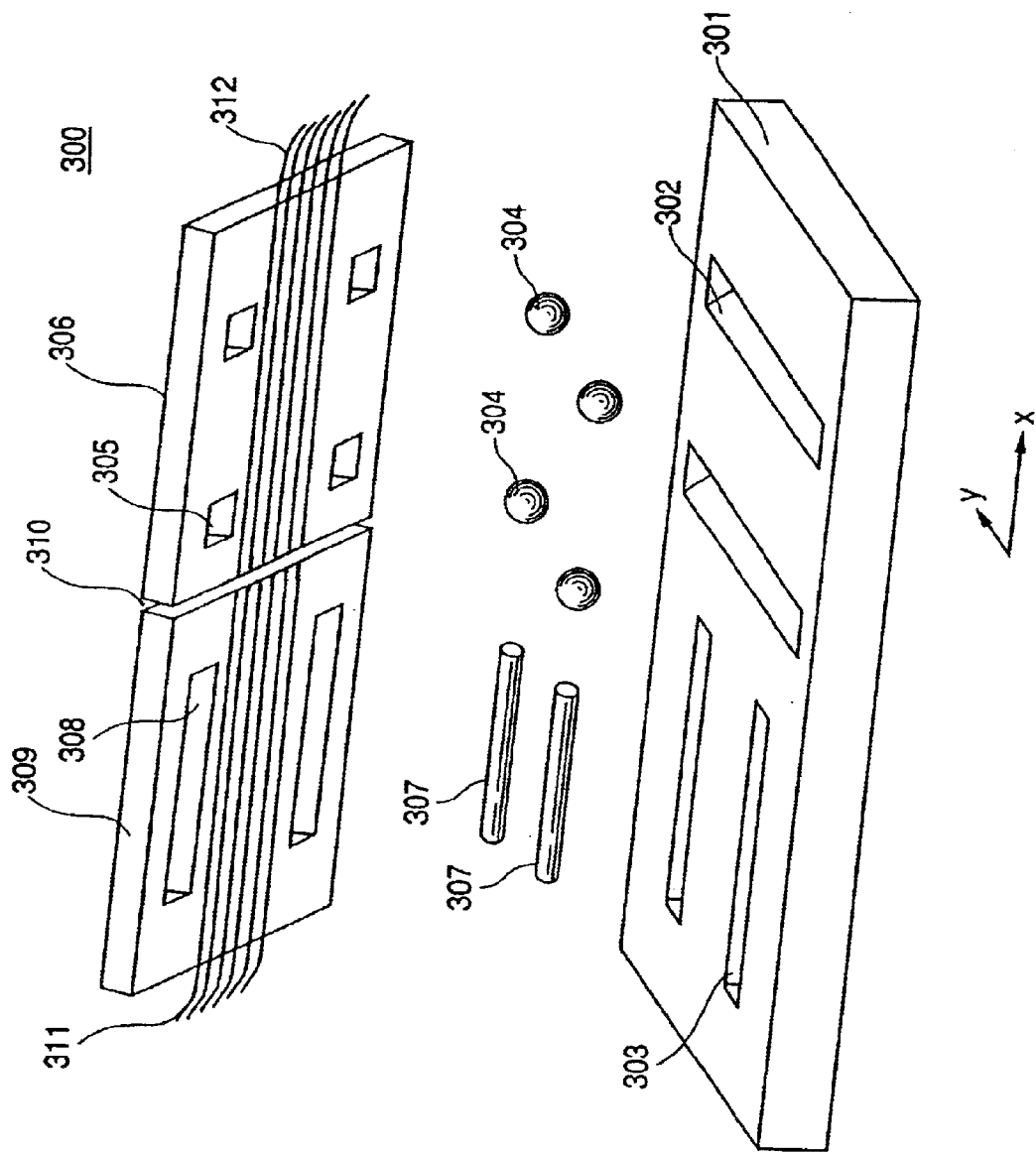
FIG. 3 is an exploded view of an optical switch according to an exemplary embodiment of the present invention.

FIG. 3 shows an optical switch 300 according to another illustrative embodiment of the present invention. A substrate 301 has transverse grooves 302 and longitudinal grooves 303. Positioning members 304 are disposed between transverse grooves 302 and pits 305 in first waveguide holding member 306. The positioning members 304 are constrained in pits 305 and move along longitudinal grooves 302, which enables transverse motion of first waveguide holding member 306 in a manner similar to that described in connection with the illustrative embodiment of FIG. 2.

Positioning members 307 are disposed between longitudinal grooves 303 in substrate 301 and grooves 308 disposed in second waveguide holding member 309. Positioning members 307 are illustratively cylindrical-shaped rod elements which enable the longitudinal motion (x-direction) of first waveguide holding member 306. illustratively, positioning members 307 may be sections of optical fiber or micromachined rods. Moreover, positioning members may be glass, metal or ceramic. Similar to the illustrative embodiment of FIGS. 1 and 2 the longitudinal motion of second waveguide holding member 309 enables the adjustment of the gap spacing 310 between the first waveguide holding member 306 and the second waveguide holding member 309 to enable coupling of optical fibers 311 and 312.

In the illustrative embodiments of FIGS. 2 and 3, the grooves 202, 203, 302, 303 and 308 are illustratively v-shaped grooves. The pits 207, 208 and 305 are illustratively inverted pyramidal-shaped pits. The grooves and pits are formed by illustrative techniques described below. Finally, in the illustrative embodiments of FIGS. 2 and 3, first waveguide holding members 205 and 306 and second waveguide holding member 206 each include four pits which constrain positioning members 204 and 304. As can be readily appreciated, at least three pits are required for stability and motion constrain. Other numbers of pits and positioning members may be used in keeping with the present invention. Finally, grooves 202, 203, 302, 303 and 308 and pits 207, 208 and 305 maybe lined with a suitable material to reduce wear and/or friction.

The inverted pyramidal pits and grooves may be formed by anisotropic wet etching of a monocrystalline material. Illustratively, monocrystalline material may be selectively etched according to known techniques. The surfaces of the inverted pyramidal pits are along well-defined principle planes of the monocrystalline material. One such known technique for anisotropic etching of monocrystalline material may be found in U.S. Pat. No. 4,210,923 to North, et al., the disclosure of which is specifically incorporated by reference herein. Of course, other known etching techniques may (wet or dry) be used to form the pits and grooves. Moreover, other materials may be used for the substrate and first and second waveguide holding members. These include, but are not limited to, glass, quartz, metal or plastic. The grooves and pits may be formed therein by known techniques.

In the illustrative embodiments of the present invention, a movement guiding member may comprise a positioning member disposed between a pit and a groove. The pits may be located in the waveguide holding member or in the substrate depending on application. Moreover, a movement guiding member may comprise a positioning member disposed between two grooves. Again, the grooves may be located in the substrate and in the waveguide holding member. Again, this is merely illustrative of the movement guiding members of the exemplary embodiments of the present invention, and other movement guiding members may be used in carrying out the invention.

Figure 4:
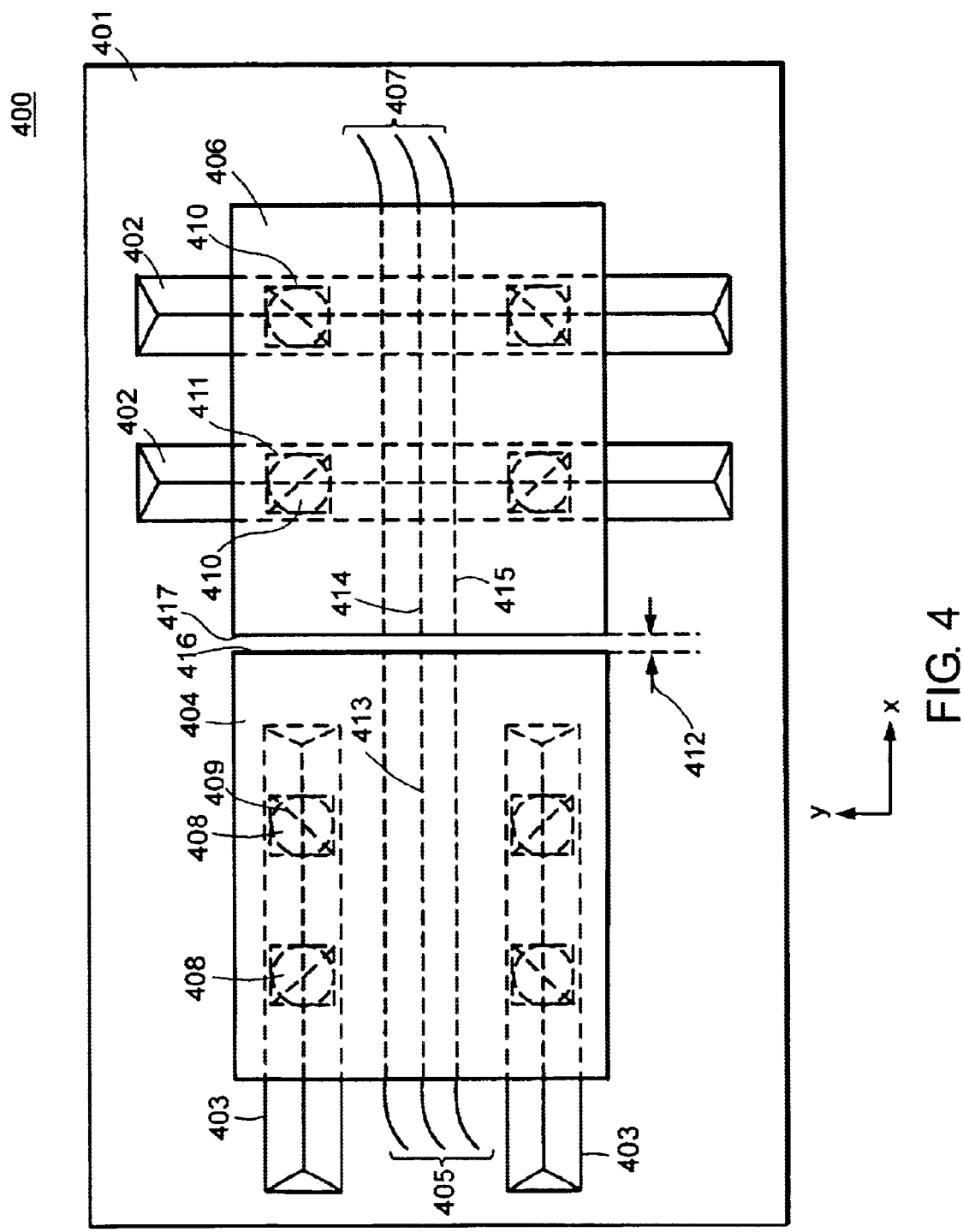
FIG. 4 is a top view of an optical switch according to yet another exemplary embodiment of the present invention.

FIG. 4 shows an optical switch 400 according to an illustrative embodiment of the present invention. A substrate 401 has transverse v-grooves 402 disposed therein. The substrate 401 further includes longitudinal v-grooves 403. A first waveguide holding member 404 includes first waveguides 405. The waveguides 405 may be disposed on top of the first waveguide holding member 404; on the bottom of first waveguide holding member 404; or within the first waveguide holding member 404. A second waveguide holding member 406 includes second waveguides 407. The second waveguides 407 may be disposed on a top surface of second waveguide holding member 406; a bottom surface of second waveguide holding member 406; or within the second waveguide holding member 406. Waveguides 405 and 407 are illustratively optical fibers. However, waveguides 405 and 407 may be planar waveguides. In the illustrative embodiment of FIG. 4, first positioning members 408 are disposed in pits 409 in the first waveguide holding member 404. Likewise, second positioning members 410 are disposed in pits 411 in the second waveguide holding member 406.

As described above, the pits 409 are illustratively inverted pyramidal pits. The first positioning members 408 are relatively self-contained within the pits 409, and cooperatively engage the longitudinal grooves 403. Illustratively, a movement guiding member may comprise a first positioning member 408 disposed between a pit 409 and a longitudinal groove 403. In the illustrative embodiment shown in FIG. 4, this translates to motion of the first waveguide holding member 404 in the ± x-direction. As can be readily appreciated, motion in the ± x-direction facilitates the longitudinal alignment of the first waveguides 405 with the second waveguides 407. Particularly, the constrained linear motion of the first waveguide holding member 404 in the longitudinal direction enables the proper selection of the gap spacing 412.

The second positioning members 410 are disposed in pits 411. Again, the second positioning members 410 are constrained in the pits 411, which are illustratively inverted pyramids. The second positioning members 410 are constrained by grooves 402 to move in the traverse direction. In the illustrative embodiment shown in FIG. 4, this results in the transverse motion of the second waveguide holding member 406 in the ±y-direction.

Illustratively, a movement guiding member may comprise a second positioning member 410 disposed between a pit 411 and a transverse groove 413. The transverse motion of waveguides 407 relative to waveguides 405 enables the selective coupling/decoupling of waveguides. This facilitates the switching of a signal from one waveguide to another. For example, an optical signal may be traversing waveguide 413 of the first waveguide holding member 404. This waveguide may be coupled to waveguide 414 disposed in second waveguide holding member 406. As can be readily appreciated, movement of the second waveguide holding member 406 in either the +y-direction or the −y-direction may uncouple waveguide 413 from waveguide 414. Movement in the +y-direction, for example of a predetermined distance may enable coupling of the optical signal traversing waveguide 413 into waveguide 415. As such, coupling of the optical signal is "switched" from waveguide 414 to waveguide 415.

In the exemplary embodiment, waveguides 405 and 407 each comprise a row of three waveguides. Of course, this is for purposes of illustration, and more or fewer waveguides may be used. Moreover, as can be readily appreciated, waveguides 405 of the first waveguide holding member 404 may be a linear array (a row) or a matrix of a suitable number of rows and columns of optical waveguides. Likewise, optical waveguides 407 of the second waveguide holding member 406 may also be a linear array (a row) or a matrix having a suitable number of rows and columns. Moreover, the pitch between waveguide 405 may be the same or different than that of waveguides 407. As such, sophisticated switching schemes may be realized through the transverse motion of the second waveguide holding member 406 relative to the first waveguide holding member 404.

Figure 5:
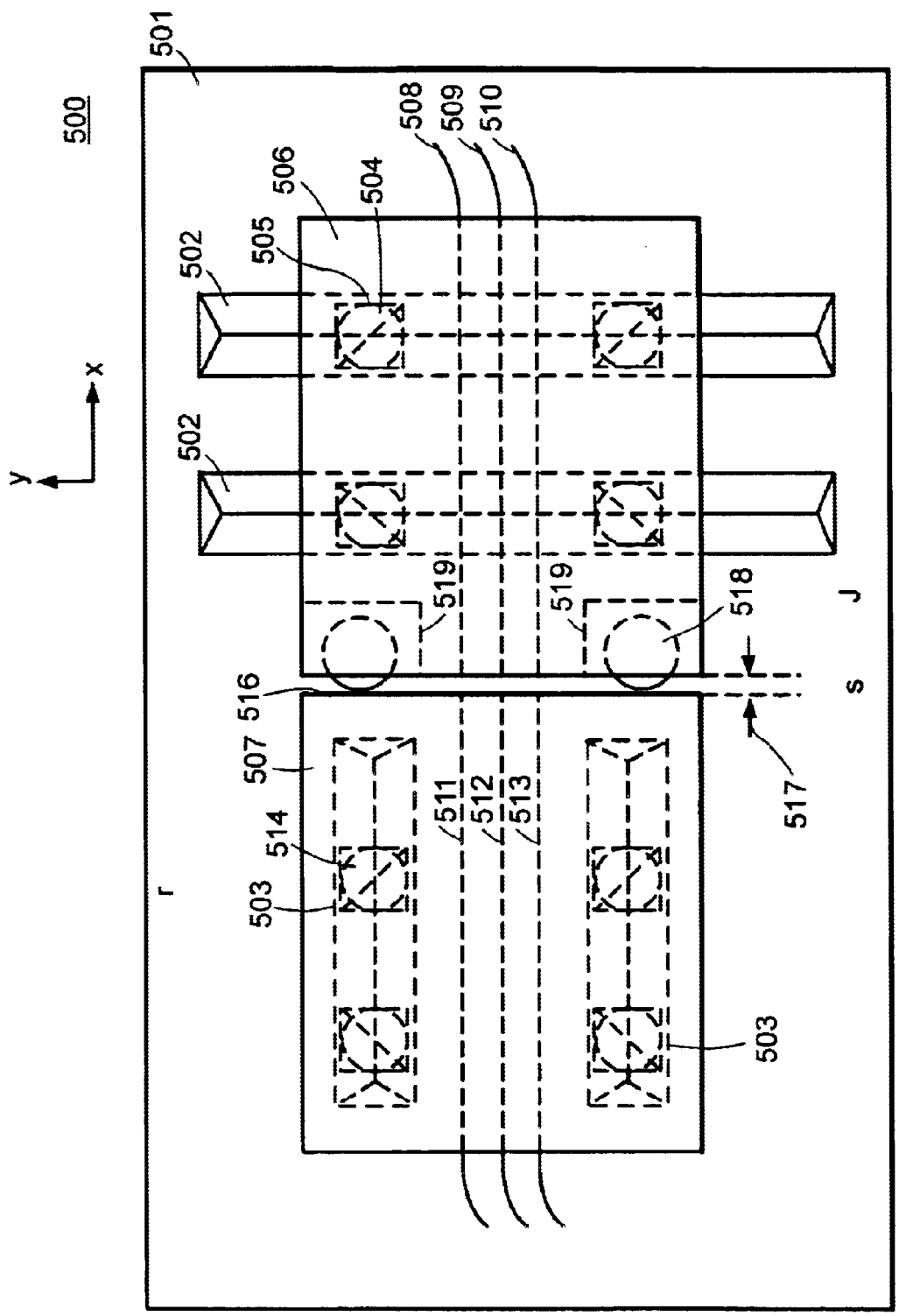
FIG. 5 is a top view of an optical switch according to yet another exemplary embodiment of the present invention.

FIG. 5 shows an optical switch 500 according to another illustrative embodiment of the present invention. A substrate 501 has transverse grooves 502 disposed therein. The substrate 501 also includes longitudinal grooves 503. The transverse grooves 502 receive positioning members 504 which are disposed in pits 505 in the second waveguide holding member 506. In the present illustrative embodiment, movement guiding members may comprise positioning member 504 between pits 505 and transverse grooves 502.

The motion of the positioning members 505 in the transverse grooves 502 enables the transverse motion (y-direction) of the second waveguide holding member 506 relative to the first waveguide holding member 507. The transverse motion enables the selective coupling/decoupling of optical waveguides 508, 509 and 510 to waveguides 511, 512 and 513, respectively. Transverse motion of the second waveguide holding member 506 would change this coupling, enabling a switching action.

In the illustrative embodiment of FIG. 5, positioning members 514 are disposed in pits 515 in the second waveguide holding member 507. As can be readily appreciated, the engagement of the positioning members 514 within the longitudinal grooves 503 in the substrate 501 enables longitudinal movement (x-direction) of the second waveguide holding member 507. According to the illustrative embodiment of FIG. 5, the second waveguide holding member 507 may have an endface 516 which is polished. The gap spacing 517 may be accurately determined by elements 518 which are illustratively ball lenses or microspheres disposed in grooves 519 the first waveguide holding member 506. The gap spacing 517 is illustratively in the range of approximately less than 1 μm to approximately 15 μm.

FIGS. 6-9 are illustrative embodiments of the substrate and waveguide holding members according to the present invention. These embodiments are intended to be illustrative of different combinations of grooves and pits which will allow the relative transverse motion of the first and second waveguide holding members for optical switching. These exemplary embodiments also provide longitudinal motion to adjust a gap spacing between the first and second waveguide holding members. These embodiments are intended to be illustrative, and in no way exhaustive of the combinations of the location of grooves and pits that can be used to carry out the invention of the present disclosure. As such, these variations and combinations that would be readily apparent to one having ordinary skill in the art are within the scope of the appended claims and equivalents thereof.

Figure 6:
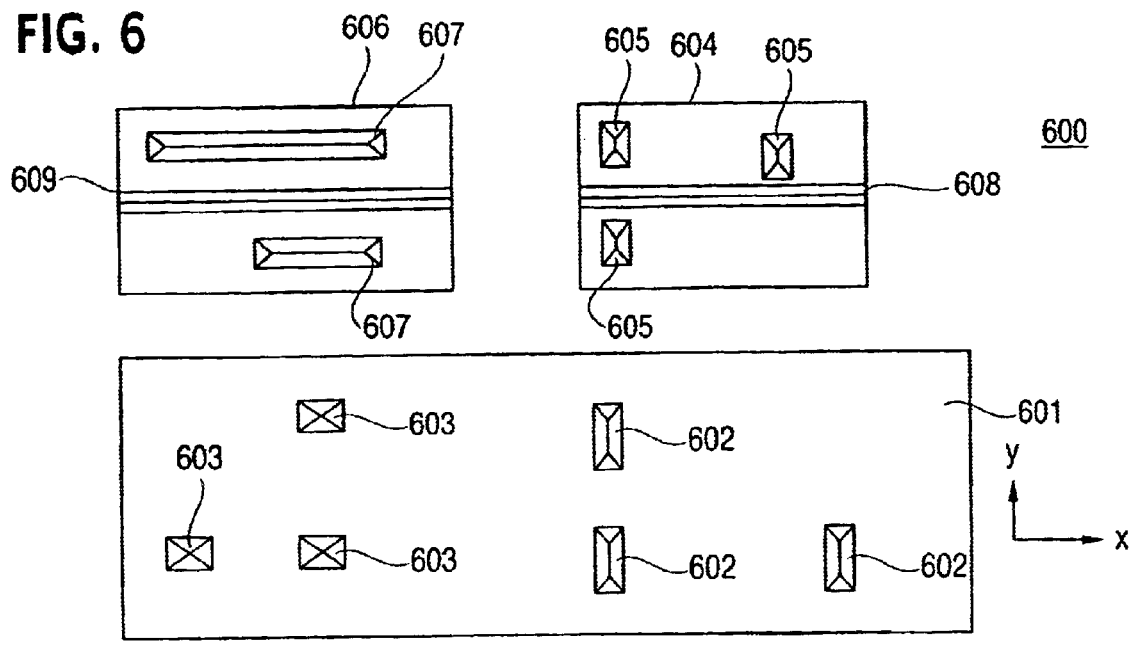

FIG. 6 shows the elements of an optical switch 600 according to an illustrative embodiment of the present invention. A substrate 601 includes grooves 602 and pits 603. Again, the grooves 602 and pits 603 are fabricated by known techniques as described in detail above. The grooves 602 and pits 603 are adapted to received positioning members (not shown) such as those described in the connection with the illustrative embodiments above. A first waveguide holding member 604 includes grooves 605. The grooves 605 having the positioning members (not shown) therein which enable the transverse motion (y-direction) of the first waveguide holding member 604. The second waveguide holding member 606 has grooves 607 therein. The grooves 607 which are adapted to receive the positioning members (not shown) enable the longitudinal motion (x-direction) of the second waveguide holding member 606. Again, the transverse motion of the first waveguide holding member 604 relative to the second waveguide holding member 606 enables the switching operation of waveguides 608 and 609.

The longitudinal motion of the second waveguide holding member 606 enables the optical coupling of the optical fibers 608 and 609 by adjusting the gap spacing therebetween. In the illustrative embodiment shown in FIG. 6, it is useful to adhere the second waveguide holding member 606 to the substrate 601 after the gap spacing has been set.

Figure 7:
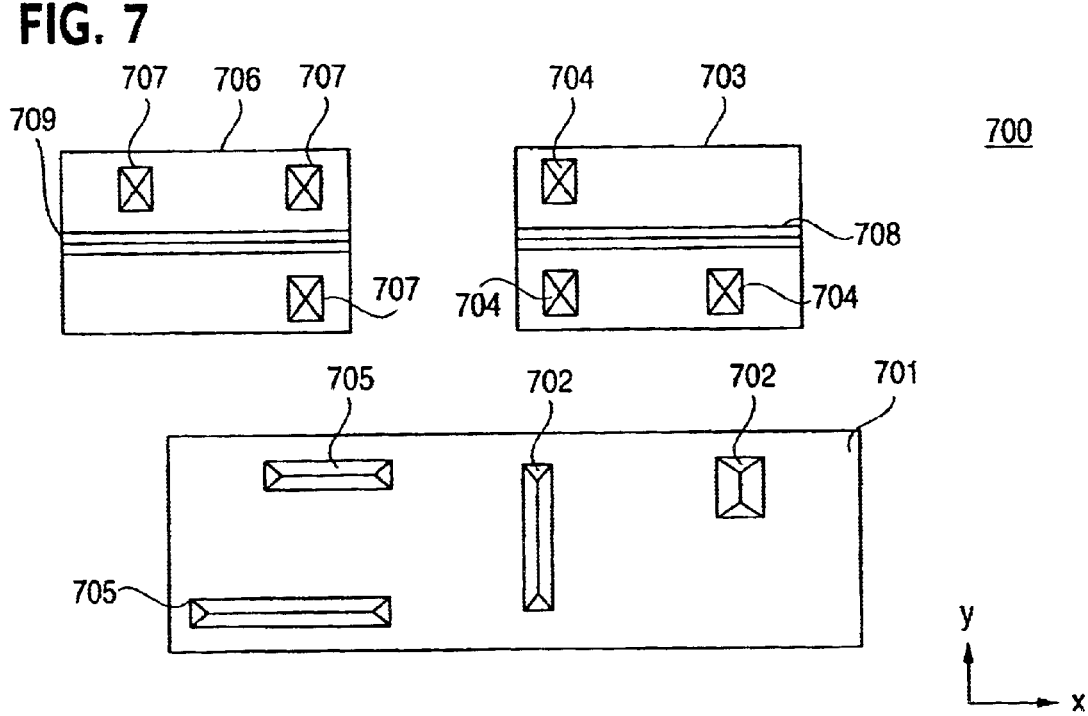

FIG. 7 shows another optical switch 700 according to yet another illustrative embodiment of the present invention. The substrate 701 has grooves 702 which cooperatively engage positioning members (not shown) enabling transverse motion of the first waveguide holding member 703. The positioning members are disposed in pits 704 in the first waveguide holding member 703. Longitudinal grooves 705 receive positioning members (not shown) which are disposed in pits 707 in the second waveguide holding member 706. This enables longitudinal movement of the second waveguide holding member 706.

As described in connection with the illustrative embodiments above, waveguides 708 and 709 are selectively coupled/decoupled with the transverse motion of the first waveguide holding member 703 relative to the second waveguide holding member 706. Moreover, the longitudinal motion of the second waveguide holding member 706 enables accurate gap spacing between the first waveguide holding member 703 and the second waveguide holding member 706, thereby enabling efficient coupling between the waveguides 708 and 709. After the gap spacing is adjusted, a suitable adhesive known to one of ordinary skill in the art may be used to fix the position of the first waveguide holding member and thereby set the gap spacing at the determined position.

FIG. 8 shows an optical switch 800 according to yet another illustrative embodiment of the present invention. In the illustrative embodiment of FIG. 8, a substrate 801 has transverse grooves 802 which cooperatively engage positioning members (not shown) which may be disposed in grooves 803 in the first waveguide holding member 804. As can be readily appreciated, the arrangement of the grooves 802 and 803 with the positioning member disposed therebetween enables the transverse motion of the first waveguide holding member 804. Pits 805 receive positioning members (not shown). These positioning members are disposed in grooves 806 in second waveguide holding member 807. Again, the longitudinal motion of the second waveguide member enables the coupling of waveguides 808 to waveguides 809 by setting the appropriate gap spacing between the waveguide holding members 804 and 807. Of course, the transverse motion of the first waveguide holding member 804 relative to the second waveguide holding member 807 results in the selective coupling/decoupling of waveguides 808 and 809 which enables the desired switching action.

FIG. 9 shows an optical switch 900 according to yet another illustrative embodiment of the present invention. A substrate 901 has transverse grooves 902 which cooperatively engage positioning members (not shown). The positioning members also cooperatively engage grooves 903 disposed in the first waveguide holding member 904. As can be readily appreciated, the arrangement of grooves 902 and 903 with the positioning members disposed therebetween enables transverse motion of the first waveguide holding member 904. Second waveguide holding member 905 includes a groove 906 and a pit 907. Substrate 901 includes a groove 908 and pits 909. Positioning members (illustratively microspheres) may be positioned in pits 909. These positioning members engage groove 906. A positioning member may be disposed in pit 907. This positioning member may engage groove 908. The combination of grooves and pits in the second waveguide holding member 905 and the substrate 901 enables the longitudinal motion of the second waveguide holding member 905.

From the foregoing description, particularly of the illustrative embodiments shown in FIGS. 2-9, the following generalities may be realized. The grooves and pits may be collectively referred to as depressions. These depressions may be in the substrate and in the first and second waveguide holding members. A waveguide holding member usefully has at least two depressions. The portion of the substrate opposed to the waveguide holding member (i.e. the portion of the substrate over which the waveguide holding member is disposed) usefully includes at least two depressions. Moreover, at least three of the depressions are grooves. Finally, no two opposing are pits. A similar analysis applies to the waveguide holding member disposed on the other portion of the substrate.

The invention having been described in detail in connection through a discussion of exemplary embodiments, it is clear that various modifications of the invention will be apparent to one having ordinary skill in the art having had the benefit of the present disclosure. Such modifications and variations are included within the scope of the appended claims.

We claim:

1. An optical switch, comprising:

A first waveguide holding member and a second waveguide holding member disposed over a substrate, wherein said first waveguide holding member moves relative to said second waveguide holding member; and at least one movement guiding member which guides the motion of said first waveguide holding member relative to said substrate so that said first waveguide holding member moves transversely relative to said second waveguide holding member, wherein each of said at least one movement guiding members comprises a positioning member disposed between a pit and a groove.

2. An optical switch as recited in claim 1, wherein said second waveguide holding member is stationary relative to said substrate.

3. An optical switch as recited in claim 1, wherein said second waveguide holding member moves relative to said substrate.

4. An optical switch as recited in claim 1, wherein said second waveguide holding member moves longitudinally relative to said first waveguide holding member.

5. An optical device as recited in claim 1, wherein said transverse movement of said first waveguide holding member selectively couples at least one waveguide of said first waveguide holding member to at least one waveguide of said second waveguide holding member.

6. An optical switch as recited in claim 1, wherein said pit is disposed in said first waveguide holding member, and said groove is disposed in said substrate.

7. An optical switch as recited in claim 1, wherein said pit is disposed in said substrate and said groove is disposed in said first waveguide holding member.

8. An optical switch as recited in claim 1, wherein said second waveguide holding member moves transversely relative to said first waveguide holding member and at least one other movement guiding member guides said movement of said second waveguide holding member.

9. An optical switch as recited in claim 8, wherein each of said at least one other movement guiding members further comprises a positioning member disposed between a pit and a groove.

10. An optical switch as recited in claim 8, wherein each of said at least one other movement guiding members further comprises a positioning member disposed between a first groove and a second groove.

11. An optical switch as recited in claim 9, wherein said pit is disposed in said second waveguide holding member, and said groove is disposed in said substrate.

12. An optical switch as recited in claim 9, wherein said groove is disposed in said second waveguide holding member, and said pit is disposed in said substrate.

13. An optical device as recited in claim 1, wherein said second waveguide holding members each include an mxn array of waveguides, wherein $m \geq 1$ and $n \geq 0$.

14. An optical device as recited in claim 13, wherein said waveguides are chosen from the group consisting essentially of optical fibers and planar waveguides.

15. An optical switch, comprising:

a first waveguide holding member and a second waveguide holding member disposed over a substrate, wherein said first waveguide holding member moves relative to said second waveguide holding member; and at least one movement guiding member which guides the motion of said first waveguide holding member relative to said substrate so that said first waveguide holding member moves transversely relative to said second waveguide holding member, wherein each of said at least one movement guiding members further comprises a positioning member disposed between a first groove and a second groove.

16. An optical switch, comprising: A substrate having a first waveguide holding member and a second waveguide holding member disposed thereon, each of said first and second waveguide holding members having at least three pits therein and each of said pits having a positioning member therein; and at least two transverse grooves and at least two longitudinal grooves disposed in said substrate.

17. An optical switch as recited in claim 16, wherein said positioning members of said second waveguide holding member selectively engage said at least two transverse grooves.

18. An optical switch as recited in claim 16, wherein said positioning members of said first waveguide holding member selectively engage said at least two longitudinal grooves.

19. An optical switch as recited in claim 18, wherein said first waveguide holding member moves longitudinally to set a gap spacing between said first and said second waveguide holding members.

20. An optical switch as recited in claim 17, wherein said second waveguide holding member moves transversely along said at least two transverse grooves and said transverse movement selectively couples at least one waveguide of said first waveguide holding member to at least one waveguide of said second waveguide holding member.

21. An optical switch as recited in claim 17, wherein said second waveguide holding member moves transversely along said at least two transverse grooves and said transverse movement selectively decouples at least one waveguide of said first waveguide holding member from at least one waveguide of said second waveguide holding member.

22. An optical switch, comprising: A first waveguide holding member having at least two longitudinal grooves; a second waveguide holding member having at least two transverse grooves; and a substrate having at least three pits each having positioning members therein which engage said longitudinal grooves and at least three pits having positioning members therein which engage said transverse grooves.

23. An optical switch as recited in claim 22, wherein said first waveguide holding member moves longitudinally to set a gap spacing between said first and said second waveguide holding members.

24. An optical switch as recited in claim 22, wherein said second waveguide holding member moves transversely along said at least two transverse grooves and said transverse movement selectively couples at least one waveguide of said first waveguide holding member to at least one waveguide of said second waveguide holding member.

25. An optical switch as recited in claim 22, wherein said second waveguide holding member moves transversely along said at least two transverse grooves and said transverse movement selectively decouples at least one waveguide of said first waveguide holding member from at least one waveguide of said second waveguide holding member.

26. An optical switch, comprising: A substrate having at least one longitudinal groove and at least one transverse groove; a first waveguide holding member having at least one transverse groove; and a second waveguide holding member having at least one longitudinal groove.

27. An optical switch as recited in claim 26, wherein positioning members are disposed between each of said at least one longitudinal grooves in said substrate and each of said at least one longitudinal groove in said second waveguide holding member.

28. An optical switch as recited in claim 26, wherein positioning members are disposed between each of said at least one transverse grooves in said substrate and each of said at least one transverse groove in said first waveguide holding member.

29. An optical switch as recited in claim 26, wherein said substrate further includes at least one pit.

30. An optical switch as recited in claim 26, wherein said second waveguide holding member further includes as least one pit.

31. An optical switch as recited in claim 26, wherein said first waveguide holding member further includes as least one pit.

32. An optical switch, comprising:
At least two waveguide holding members disposed on a substrate;
at least two holding member depressions disposed in each of said at least two waveguide holding members; and
at least two substrate depressions disposed in said substrate,
wherein at least three of said substrate and holding member depressions are grooves, and wherein at least one of said substrate and holding member depressions is configured to permit transverse movement of said waveguide holding members relative to one another to effect optical switching.

33. An optical switch, comprising:
a first waveguide holding member and a second waveguide holding member disposed over a substrate, said first waveguide holding member being movable relative to said substrate; and
at least one movement guiding member disposed between said substrate and said first waveguide holding member to guide the motion of said first waveguide holding member relative to said second waveguide holding member, said movement guiding member comprising at least one depression and at least one positioning member disposed in said depression.

34. An optical switch as recited in claim 33, wherein said movement guiding member is configured to permit said first waveguide holding member to move transversely relative to said second waveguide holding member to selectively couple a waveguide of said first waveguide holding member to a waveguide of said second waveguide holding member.

35. An optical switch as recited in claim 33, wherein said movement guiding member is configured to permit said first waveguide holding member to move longitudinally relative to said second waveguide holding member.

36. An optical switch as recited in claim 33, wherein said at least one depression is disposed in said substrate.

37. An optical switch as recited in claim 33, wherein said at least one depression is disposed in said first waveguide holding member.

38. An optical switch as recited in claim 33, wherein said at least one depression comprises a first groove disposed in said substrate and a second groove disposed in said first waveguide holding member, and wherein said positioning member is engaged with said first and second grooves.

39. An optical switch as recited in claim 33, wherein said positioning member comprises at least one of a sphere and a rod.

40. An optical switch as recited in claim 33, wherein said substrate comprises a monocrystalline material, and wherein at least one of said first and second waveguide holding members comprises a monocrystalline material.

41. An optical switch as recited in claim 33, comprising at least one movement guiding member disposed between said substrate and said second waveguide holding member to guide the motion of said second waveguide holding member relative to said first waveguide holding member, said movement guiding member comprising at least one depression and at least one positioning member disposed therein.

* * * * *